(12) United States Patent
Hsu et al.

(10) Patent No.: US 11,738,529 B2
(45) Date of Patent: Aug. 29, 2023

(54) SHOE, ENVIRONMENTALLY FRIENDLY SHOE COMPONENT THEREOF, AND METHOD OF MANUFACTURING ENVIRONMENTALLY FRIENDLY SHOE COMPONENTS

(71) Applicant: CCILU INTERNATIONAL INC., Taichung (TW)

(72) Inventors: Chih-Jen Hsu, Taichung (TW); Chia-Ming Hsu, Taichung (TW); Chen-En Kao, Taichung (TW)

(73) Assignee: CCILU International Inc., Taichung (TW)

( * ) Notice: Subject to any disclaimer, the term of this patent is extended or adjusted under 35 U.S.C. 154(b) by 293 days.

(21) Appl. No.: 17/018,444

(22) Filed: Sep. 11, 2020

(65) Prior Publication Data

US 2022/0080689 A1    Mar. 17, 2022

(51) Int. Cl.
| | |
|---|---|
| *B29D 35/00* | (2010.01) |
| *B29C 44/12* | (2006.01) |
| *A43B 13/02* | (2022.01) |
| *C08K 11/00* | (2006.01) |
| *B29K 21/00* | (2006.01) |
| *B29K 75/00* | (2006.01) |

(52) U.S. Cl.
CPC ........ *B29D 35/0054* (2013.01); *A43B 13/026* (2013.01); *B29C 44/1266* (2013.01); *C08K 11/005* (2013.01); *B29K 2021/006* (2013.01); *B29K 2075/00* (2013.01); *B29K 2995/0046* (2013.01); *Y02P 70/62* (2015.11); *Y10T 428/31551* (2015.04)

(58) Field of Classification Search
None
See application file for complete search history.

(56) References Cited

U.S. PATENT DOCUMENTS

| | | | |
|---|---|---|---|
| 2002/0177663 A1* | 11/2002 | Cahill | ............. C08L 67/02 525/177 |
| 2013/0046036 A1* | 2/2013 | Lebel | ............. C08K 7/06 524/130 |

* cited by examiner

*Primary Examiner* — Christopher M Rodd
(74) *Attorney, Agent, or Firm* — Wang Law Firm, Inc.

(57) ABSTRACT

An environmentally friendly shoe component of a shoe includes scraps and an elastic material layer within which the scraps are distributed, the scraps include bottle scraps made by crushing plastic bottles, the elastic material layer is made of thermosetting polyurethane elastomer, and at least a part of the scraps is visible by a human's naked eye.

8 Claims, 6 Drawing Sheets

SHOE, ENVIRONMENTALLY FRIENDLY SHOE COMPONENT THEREOF, AND METHOD OF MANUFACTURING ENVIRONMENTALLY FRIENDLY SHOE COMPONENTS

BACKGROUND

Field of the Invention

The present invention relates to shoes, and more particularly to a shoe, an environmentally friendly shoe component thereof, and a method for manufacturing the environmentally friendly shoe component.

Related Prior Art

With the advancement of technology and the rise of environmental awareness, more and more manufacturers on the market have begun to use recycled resources or recycled waste as materials for making products. However, most of the existing shoes on the market, such as sports shoes, sandals, slippers, casual shoes, etc., have soles made of a single material, for example, made of rubber with good wear resistance and elasticity. Therefore, how to apply recycled waste to shoe soles as one of the materials for manufacturing shoe soles is a topic to be solved at present.

SUMMARY

One objective of the present invention is to provide a shoe, an environmentally friendly shoe component thereof, and a method for manufacturing the environmentally friendly shoe component, whereby the environmentally friendly shoe component can maintain its due function and take environmental protection into account.

According to an embodiment of the present invention, a method for manufacturing an environmentally friendly shoe component of a shoe comprises: mixing scraps and a foaming material to provide a shoe material mixture, the scraps including bottle scraps formed by crushing plastic bottles; putting the shoe material mixture into a mold and compression molding the shoe material mixture to form the environmentally friendly shoe component; and separating the environmentally friendly shoe component from the mold.

In another embodiment, the aforementioned method further includes: heating the mold.

In yet another embodiment, the scraps further include paper scraps, wood scraps, plant scraps, coffee grounds, discarded foamed plastic fragments or combinations thereof.

In yet another embodiment, the step of mixing scraps and the foaming material to provide the shoe material mixture includes: mixing the scraps, catalyst, and thermosetting polyurethane elastomer to provide a first mixture; and mixing water with the first mixture to provide the shoe material mixture, wherein the catalyst, the water and the thermosetting polyurethane elastomer are mixed to produce the foaming material.

In yet another embodiment, in the foaming material, a content of the catalyst is 15-20% by weight, a content of the water is 10-20% by weight, and a content of the thermosetting polyurethane elastomer is 60-70% by weight. Or, a ratio of the catalyst, the water and the thermosetting polyurethane elastomer is 20:20:60 or 15:10:75.

In yet another embodiment, the foaming material is liquid rubber.

In yet another embodiment, the method for manufacturing the environmentally friendly shoe component further comprises: putting a thermoplastic polyurethane film into the mold; and covering the shoe material mixture with the thermoplastic polyurethane film to perform compression molding and produce the environmentally friendly shoe component.

The present invention further provides an environmentally friendly shoe component of a shoe according to an embodiment, the environmentally friendly shoe component includes scraps and an elastic material layer within which the scraps are disturbed, and the scraps include bottle scraps made by crushing plastic bottles. Optionally, at least a part of the scraps being visible by a human's naked eye.

In another embodiment, the environmentally friendly shoe component further includes paper scraps.

In yet another embodiment, the elastic material layer is made of rubber or thermosetting polyurethane elastomer.

In yet another embodiment of the present invention, a content of the scraps is 30-60% by weight.

In yet another embodiment of the present invention, the size of the plastic bottle scraps is 2-8 mm.

In yet another embodiment of the present invention, the environmentally friendly shoe component further comprises a thermoplastic polyurethane elastic layer formed on an outer surface of the elastic material layer.

In this way, the environmentally friendly shoe component provided by the present invention can not only maintain its due function, but also take environmental protection into account.

BRIEF DESCRIPTION OF THE DRAWINGS

After studying the detailed description in conjunction with the following drawings, other aspects and advantages of the present invention will be discovered.

DETAILED DESCRIPTION

In the following detailed description, many specific details are explained in order to provide a thorough understanding of the present invention. However, those of ordinary skill in the art will understand that the present invention can be practiced without these specific details. In other cases, well-known methods, procedures and/or elements are not described in detail so as not to obscure the present invention.

The present invention will be more clearly understood from the following description of the embodiments of the present invention, which is made by way of example only with reference to the accompanying drawings, which are not drawn to scale.

The method for manufacturing an environmentally friendly shoe component provided by the present invention can be applied to the manufacture of shoes. For example, the method for manufacturing an environmentally friendly shoe component provided by the present invention can be applied to the manufacture of shoe soles. In order to clearly illustrate the spirit of the present invention, the application of the manufacturing method to the sole of the shoe will be explained as an example in the following description.

Figure 1:
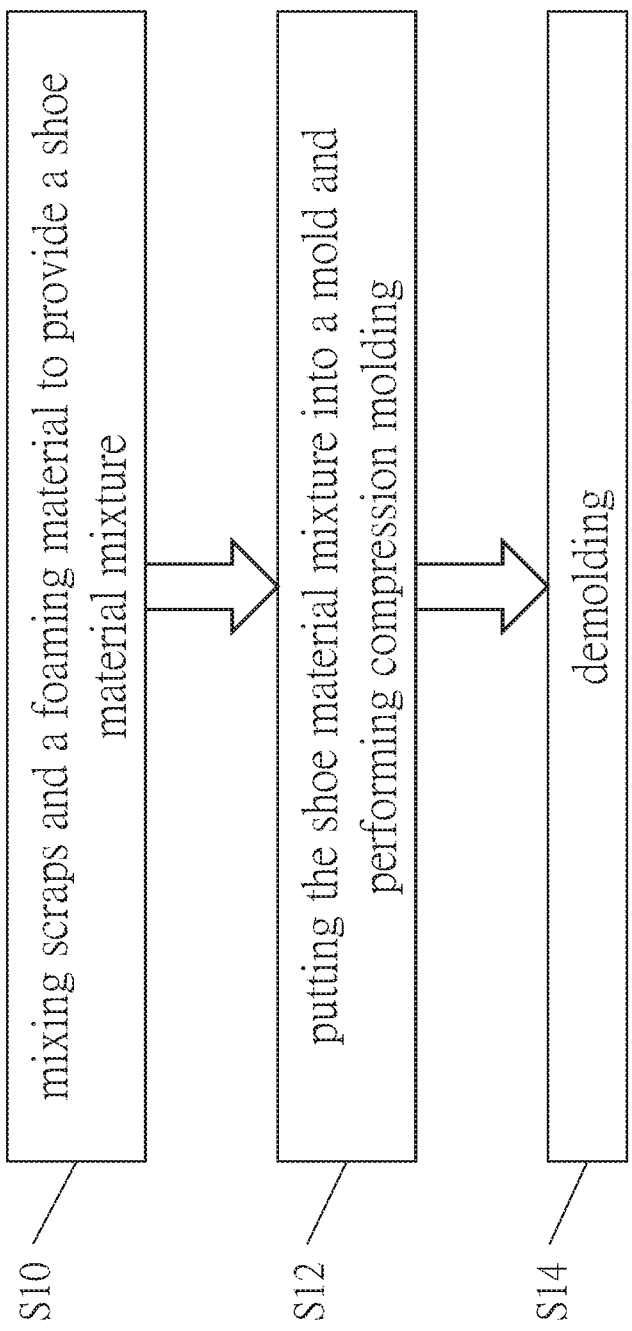
FIG. 1 is a flow chart of a method for manufacturing an environmentally friendly shoe component according to an embodiment of the present invention.

Referring to FIG. 1, according to an embodiment of the present invention, a method for manufacturing an environmentally friendly shoe component is provided. In this manufacturing method, first, in a step S10, scraps and a foaming material are mixed to provide a shoe material mixture. In this embodiment or other embodiments, the scraps here may be, for example, scraps made from recycled materials, such as plastic scraps, paper scraps, wood chips, plant scraps, coffee grounds, scraps from other recycled materials, or any combination thereof. The plastic scraps may be made by crushing, for example, PET bottles, bottle caps, or both, or by crushing waste foaming plastic fragments, such as ethylene-vinyl acetate copolymer (EVA). The size of the plastic scraps can be, for example, a size visible to the human eye, (the human's naked eye), such as 2-8 mm, but the invention is not limited to this. The foaming material can be liquid rubber, for example. The content of scraps can be, for example, 30-60 weight percent, and the content of foaming material can be, for example, 70-40 weight percent. The added foaming material is mixed with the scraps to enable the scraps to be adhered and uniformly or unevenly dispersed in the foaming material.

Next, in a step S12, the above-mentioned shoe material mixture is put into a mold and molded into the shoe component by compression molding. Furthermore, compression molding may be performed using the mold at room temperature (that is, without heating). Finally, in a step S14, the shoe component is separated from the mold.

Figure 5A:
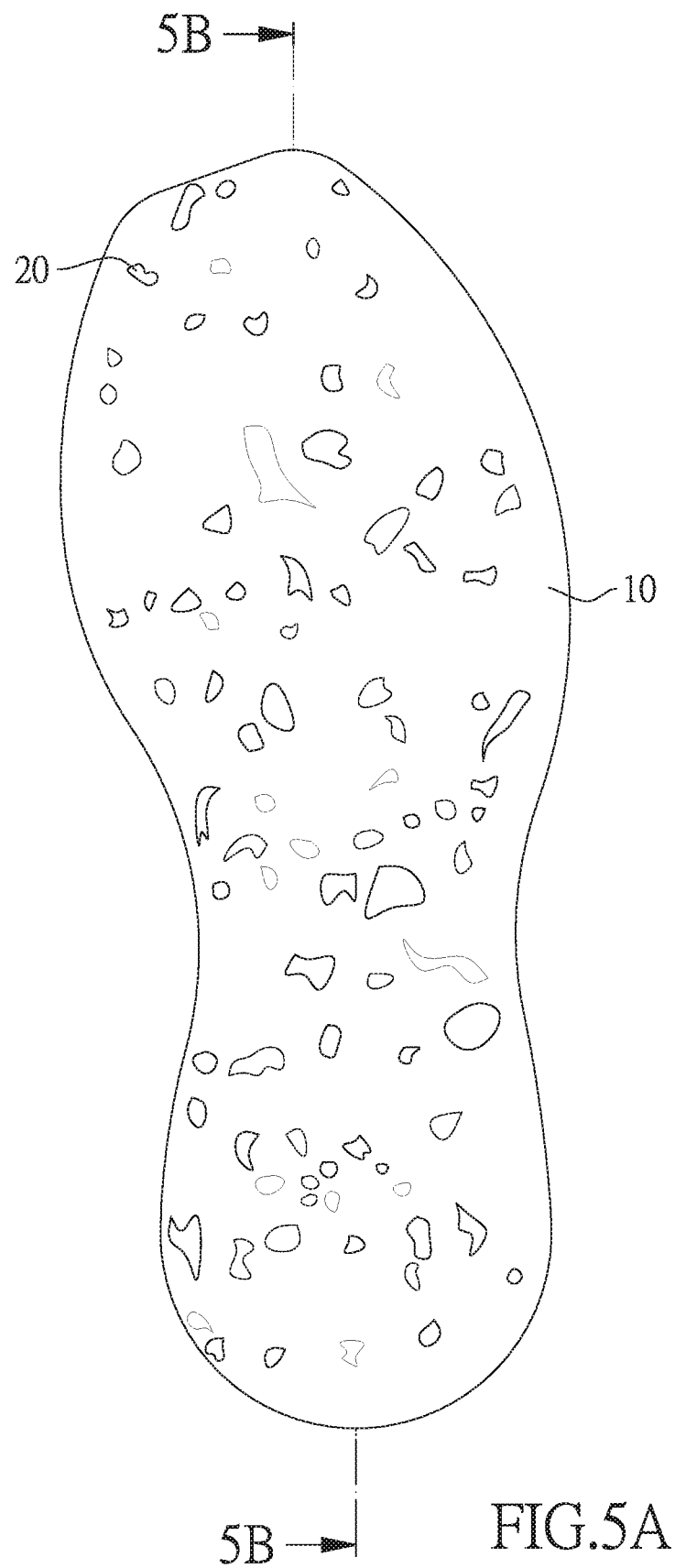
FIG. 5A is a plan view of a shoe component applied to the sole according to an embodiment of the present invention.
Figure 5B:
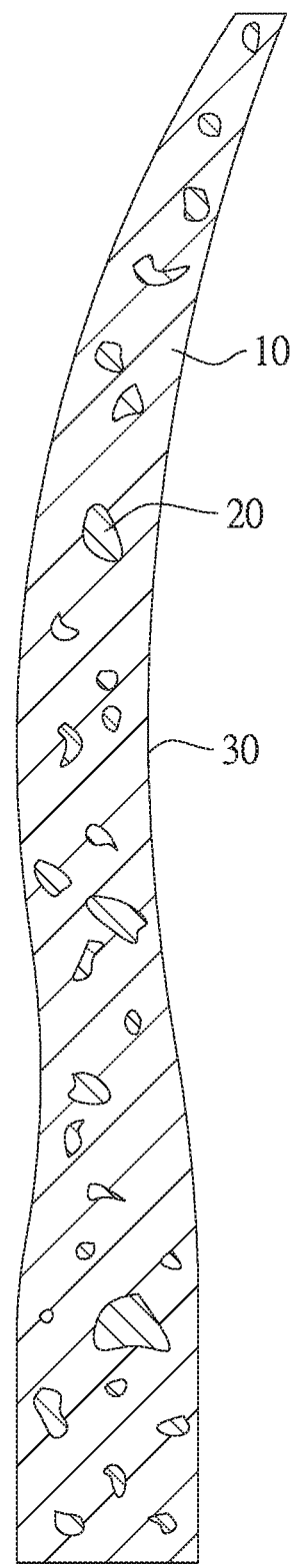
FIG. 5B is a cross-sectional view of FIG. 5A taken along the line 5B-5B.

The sole produced by the above-mentioned manufacturing method may include an elastic material layer 10 and scraps 20 as shown in FIGS. 5A and 5B. The elastic material layer 10 is a rubber formed by solidifying the liquid rubber added as a foaming material in the above step S10. The scraps are the scraps added in the step S10. As can be seen from the figures, in the step S10, dispersing the scraps in the foaming material allows the elastic material layer 10 formed by solidifying the foaming material to cover the scraps 20, and makes the scraps 20 evenly or unevenly dispersed in the sole. The scraps 20 dispersed in the sole are visible to the human eye (the human's naked eye).

Figure 2:
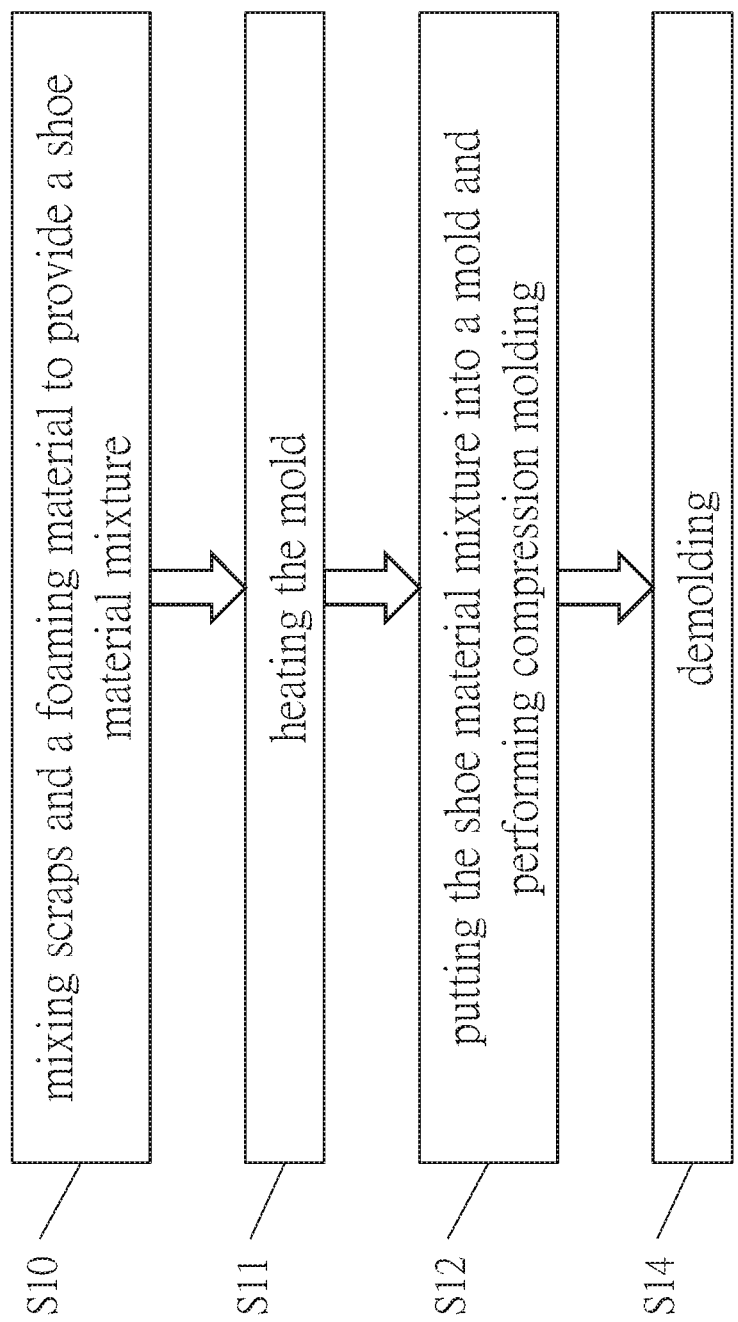
FIG. 2 is a flowchart of a method for manufacturing an environmentally friendly shoe component according to an embodiment of the present invention.

In another embodiment, the aforementioned manufacturing method can further include heating the mold, as in a step S11 shown in FIG. 2, for example, heating the mold to 50-60 degrees. Therefore, the forming efficiency of the shoe component may be accelerated and the stability of the finished product may be strengthened. Although in FIG. 2, the step S11 is performed after the step S10, the present invention is not limited to this. In other embodiments, the step S11 may be performed before the step S10, or simultaneously with the step S12.

Figure 3:
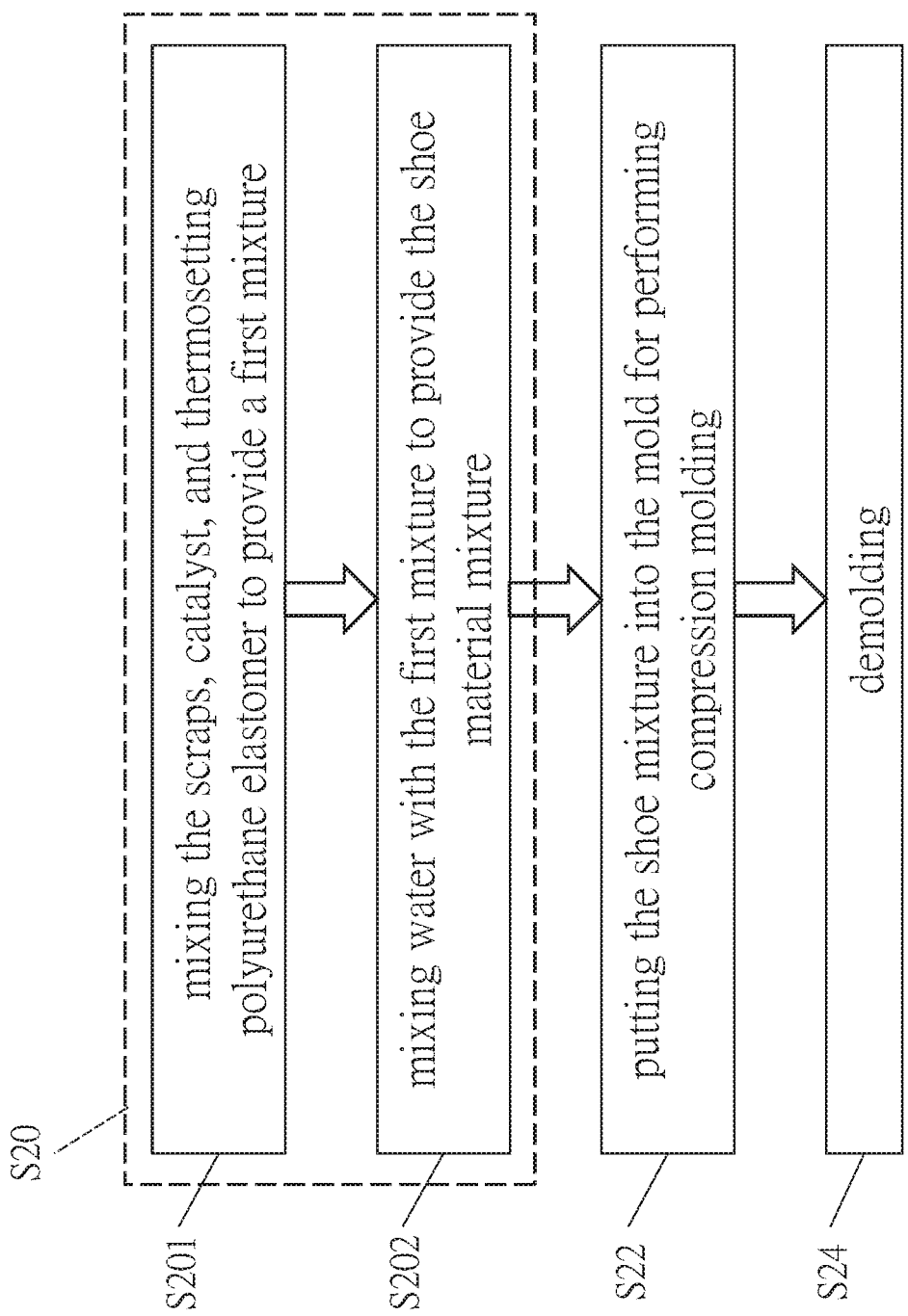
FIG. 3 is a flowchart of a method for manufacturing an environmentally friendly shoe component according to an embodiment of the present invention.

The above-mentioned embodiment is explained by using liquid rubber as an example of the foaming material. However, the present invention is not limited to this, and the above-mentioned foaming material can be replaced by other materials. For example, please refer to FIG. 3, first, in the step S20, the scraps and the foaming material are mixed to provide the shoe material mixture. In detail, the step S20 includes the following steps.

In a step S201, the scraps, catalyst, and thermosetting polyurethane elastomer (TSU) are mixed to provide a first mixture. The scraps may be scraps made of recycled materials, such as plastic scraps, paper scraps, scraps of other recycled materials, or any combination thereof. The plastic scraps can be made by crushing, for example, PET bottles, bottle caps, or a combination thereof. The size of the plastic scraps can be, for example, a size visible to the human eye (the human's naked eye), such as 2-8 mm, but the present invention is not limited to this. The catalyst can be, for example, triethylenediamine.

Then, in a step S202, water is mixed with the first mixture to provide the shoe material mixture. The catalyst, the water and the thermosetting polyurethane elastomer are mixed to produce the aforementioned foaming material. In the foaming material, the content of the catalyst can be, for example, 15-20% by weight, the content of water can be, for example, 10-20% by weight, and the content of the thermosetting polyurethane elastomer can be, for example, 60-70% by weight. Specifically, the ratio (content) of the catalyst, the water and the thermosetting polyurethane elastomer may be, for example, 20:20:60 or 15:10:75 (weight percentage). The content of the scraps can be, for example, 30-60 weight percent, and the content of the foaming material can be, for example, 70-40 weight percent. The added foaming material is mixed with the scraps to enable the scraps to be adhered and uniformly or unevenly dispersed in the foaming material.

After the shoe material mixture is formed, in a step S22, the above-mentioned shoe material mixture is putted into the mold and molded by compressing molding to produce the shoe component. More specifically, the compression molding can be performed using the mold at room temperature (that is, without heating). Finally, in a step S24, the shoe component is separated from the mold.

Figure 4:
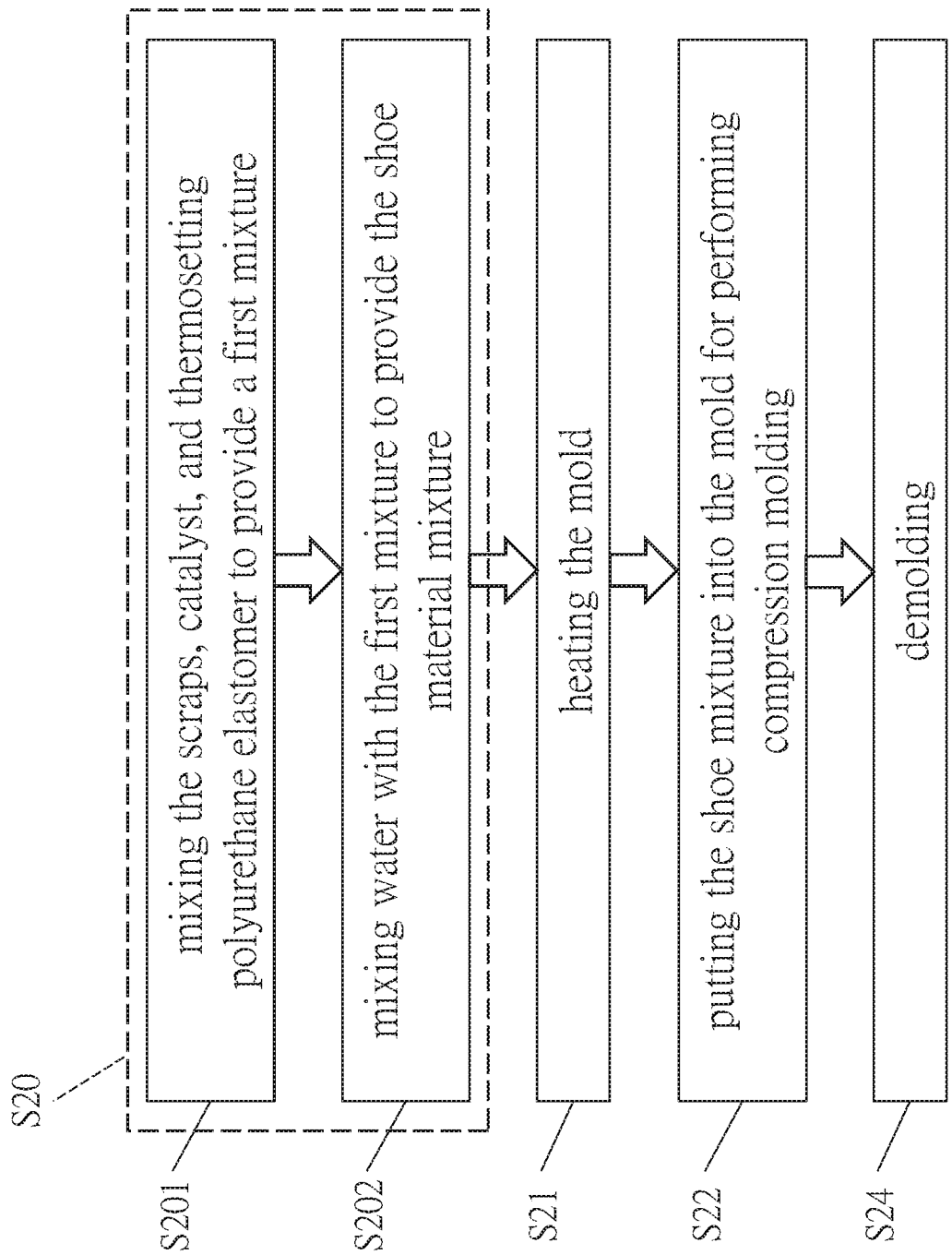
FIG. 4 is a flowchart of a method for manufacturing an environmentally friendly shoe component according to an embodiment of the present invention.

In another embodiment, the aforementioned manufacturing method can further include heating the mold, as in a step S21 shown in FIG. 4, for example, heating the mold to a temperature greater than about 80 degrees, and up to a temperature of 150 degrees for maximum. For example, when the mold is heated to 100 degrees, it takes 1.5 hours for compression molding, and when the mold is heated to 150 degrees, it takes 1 hour for compression molding. Therefore, the forming efficiency of the shoe component may be accelerated and the stability of the final product may be strengthened. Although in FIG. 4, the step S21 is performed after the step S20, the present invention is not limited to this. In other embodiments, the step S21 may be performed before the step S20 or simultaneously with the step S22.

In other embodiments of the present invention, the above step S12 (or S22) may include the following steps. First, a thermoplastic polyurethane (TPU) film is placed in the mold. Then, the above shoe material mixture is put onto the thermoplastic polyurethane film in the mold, and the thermoplastic polyurethane film covers the entire shoe material mixture. Finally, compression molding is performed to produce the shoe component. Therefore, the surface of the finished shoe component will have a thermoplastic polyurethane layer, such as a thermoplastic polyurethane layer 30 formed on an outer surface of the elastic material layer 10, as shown in FIG. 5B. In this way, not only the shoe component formed in the mold can be demolded more easily, but also the wear resistance and flexural properties of the finished shoe component can be enhanced.

Although the present invention is disclosed above with the foregoing embodiments, these embodiments are not intended to limit the present invention. All changes and modifications made without departing from the spirit and scope of the present invention fall within the scope of protection of the present invention. For the scope of protection defined by the present invention, please refer to the attached claims.

What is claimed is:

1. An environmentally friendly shoe component of a shoe, comprising scraps and an elastic material layer within which the scraps are distributed, the scraps comprising bottle scraps made by crushing plastic bottles, the elastic material layer being made of thermosetting polyurethane elastomer, and at least a part of the scraps being visible by a human's naked eye.

2. The environmentally friendly shoe component of the shoe as claimed in claim 1, wherein the scraps further include paper scraps, wood scraps, plant scraps, coffee grounds, discarded foamed plastic fragments or combinations thereof.

3. The environmentally friendly shoe component of the shoe as claimed in claim 1, wherein a content of the scraps is 30-60% by weight.

4. The environmentally friendly shoe component of the shoe as claimed in claim 1, further comprising a thermoplastic polyurethane elastic layer formed on an outer surface of the elastic material layer.

5. A shoe, comprising at least one environmentally friendly shoe component of claim 1.

6. The shoe claimed in claim 5, wherein the scraps further include paper scraps, wood scraps, plant scraps, coffee grounds, discarded foamed plastic fragments or combinations thereof.

7. The shoe claimed in claim 5, wherein a content of the scraps is 30-60% by weight.

8. The shoe claimed in claim 5, wherein the environmentally friendly shoe component further comprises a thermoplastic polyurethane elastic layer formed on an outer surface of the elastic material layer.

* * * * *